United States Patent
Olson

(10) Patent No.: US 11,161,606 B2
(45) Date of Patent: Nov. 2, 2021

(54) FLEXURED STANDPIPES FOR AIRCRAFT PROPULSION ASSEMBLIES

(71) Applicant: Textron Innovations Inc., Providence, RI (US)

(72) Inventor: Eric Stephen Olson, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 198 days.

(21) Appl. No.: 16/743,472

(22) Filed: Jan. 15, 2020

(65) Prior Publication Data

US 2021/0214076 A1 Jul. 15, 2021

(51) Int. Cl.
| | |
|---|---|
| B64C 27/59 | (2006.01) |
| B64C 27/37 | (2006.01) |
| B64C 29/02 | (2006.01) |
| F16D 3/24 | (2006.01) |
| B64C 27/14 | (2006.01) |

(52) U.S. Cl.
CPC .............. *B64C 27/59* (2013.01); *B64C 27/14* (2013.01); *B64C 27/37* (2013.01); *B64C 29/02* (2013.01); *F16D 3/24* (2013.01)

(58) Field of Classification Search
CPC ......... B64C 27/14; B64C 27/59; B64C 27/12; B64C 27/58; B64C 29/02; B64C 27/37
See application file for complete search history.

(56) References Cited

U.S. PATENT DOCUMENTS

| | | | |
|---|---|---|---|
| 2015/0125299 A1* | 5/2015 | Baskin | B64C 27/10 416/128 |
| 2019/0288493 A1* | 9/2019 | Jarrett | F16D 3/72 |

* cited by examiner

*Primary Examiner* — Philip J Bonzell
*Assistant Examiner* — Ashesh Dangol
(74) *Attorney, Agent, or Firm* — Lawrence Youst PLLC

(57) ABSTRACT

A propulsion assembly includes a rotor assembly, a mast coupled to the rotor assembly and a bull gear coupled to the mast. The bull gear is subject to radial and axial loads. The propulsion assembly includes a flexured standpipe extending through the bull gear and a ball bearing including inner and outer races interposed between the bull gear and the flexured standpipe. The ball bearing is configured to absorb axial loads from the bull gear. The bull gear is rotatably coupled to the flexured standpipe via the ball bearing. The flexured standpipe flexes in response to radial loads from the bull gear.

20 Claims, 9 Drawing Sheets

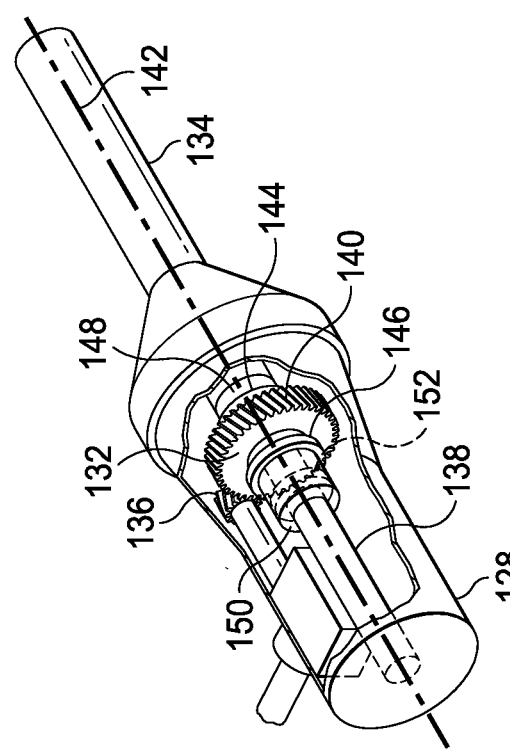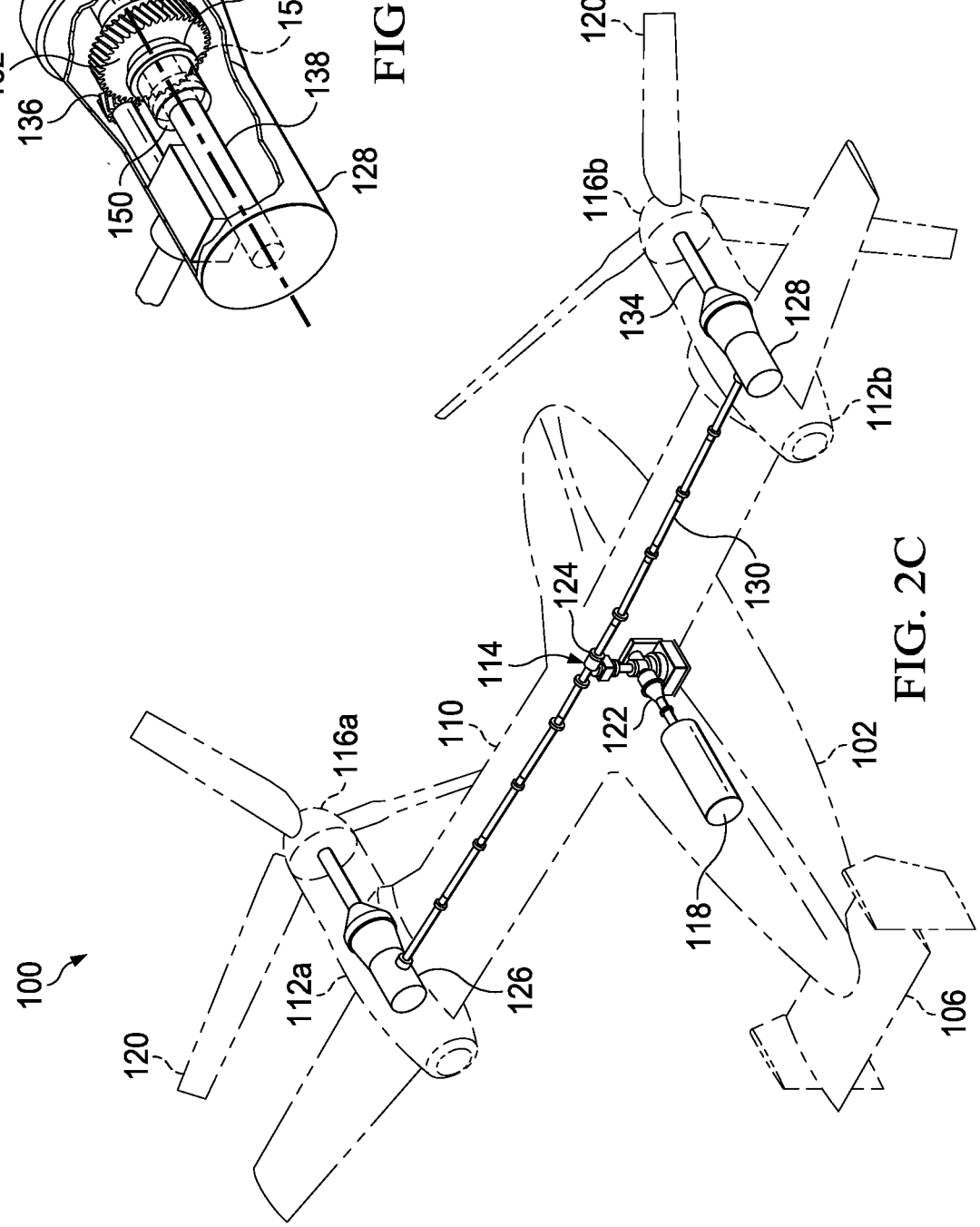

FLEXURED STANDPIPES FOR AIRCRAFT PROPULSION ASSEMBLIES

TECHNICAL FIELD OF THE DISCLOSURE

The present disclosure relates, in general, to flexured standpipes for use in aircraft propulsion assemblies and, in particular, to flexured standpipes that flex in response to radial loads from a bull gear of the propulsion assembly drivetrain, the bull gear rotatably coupled to the flexured standpipe via a ball bearing.

BACKGROUND

Rotorcraft propulsion assemblies include a drive system that transfers rotational energy from a power source, such as an engine, to a rotor. Rotorcraft drive systems include a mast, which typically extends from a transmission and terminates at a rotor hub from which a number of rotor blades radially extend. The transmission may include planetary gear systems, pinion gears, bull gears or any other type of gear to transmit rotational energy from the power source to the rotor hub. Propulsion assemblies also typically include a standpipe through which wires or other devices may pass to provide communication between the rotor hub and other rotorcraft systems.

The transmission often utilizes a bull gear that is coaxial with, and transmits rotational energy to, the mast. The bull gear may be subject to both axial and radial loads when rotated by a pinion gear. Different bearing configurations may be employed to absorb the axial and radial loads of the bull gear. One type of bearing configuration includes two roller bearings to absorb the radial loads of the bull gear and a ball bearing to absorb the axial loads of the bull gear. For this bearing configuration to work, the ball bearing should be free to move radially to keep it from absorbing significant radial load. Currently, the ball bearing configurations that are used to allow such radial freedom of the ball bearing present several drawbacks. For example, some propulsion systems utilize an unclamped, or "floating," ball bearing to provide radial clearance for components of the ball bearing. Undesired movement within unclamped ball bearings, however, leads to fretting and general bearing deterioration. Other current propulsion assemblies utilize flexured case extensions or other flexured appendages to support the ball bearing. The flexured appendages are flexible to permit radial movement of the ball bearing when subjected to radial loads. Flexured appendages, however, add weight, cost and complexity to the propulsion assembly.

SUMMARY

In a first aspect, the present disclosure is directed to a propulsion assembly including a rotor assembly, a mast coupled to the rotor assembly and a bull gear coupled to the mast. The bull gear is subject to radial and axial loads. The propulsion assembly also includes a flexured standpipe extending through the bull gear and a ball bearing including inner and outer races interposed between the bull gear and the flexured standpipe. The ball bearing is configured to absorb axial loads from the bull gear. The bull gear is rotatably coupled to the flexured standpipe via the ball bearing. The flexured standpipe flexes in response to radial loads from the bull gear.

In some embodiments, the bull gear may include an aft collar and the ball bearing may be interposed between the flexured standpipe and the aft collar of the bull gear. In certain embodiments, the inner surface of the aft collar may form a circumferential bearing retention lip. In some embodiments, the aft collar may surround the ball bearing and at least two bearing retainers configured to clamp the ball bearing. In certain embodiments, the bull gear may include a forward collar and the propulsion assembly may include forward and aft roller bearings coupled to the forward and aft collars of the bull gear, the roller bearings configured to absorb the radial loads from the bull gear. In some embodiments, the ball bearing may be aft of the aft roller bearing. In certain embodiments, the outer race of the ball bearing may be integral with the aft collar of the bull gear. In some embodiments, the bull gear may form helical gear teeth. In certain embodiments, the mast, the bull gear, the flexured standpipe and the ball bearing may be substantially coaxial. In some embodiments, the flexured standpipe may extend through the mast. In certain embodiments, the flexured standpipe may be not rotate with the bull gear and the mast.

In some embodiments, the ball bearing may be clamped to the flexured standpipe and the bull gear. In certain embodiments, the inner race of the ball bearing may be clamped to the flexured standpipe. In some embodiments, the flexured standpipe may form a bearing retention lip and the propulsion assembly may include a bearing retainer configured to clamp the inner race of the ball bearing against the bearing retention lip such that the inner race of the ball bearing is interposed between the bearing retainer and the bearing retention lip. In certain embodiments, the bearing retainer may be forward of the ball bearing. In some embodiments, the bearing retention lip may extend around the circumference of the flexured standpipe. In certain embodiments, the outer race of the ball bearing may be clamped to the bull gear. In some embodiments, the bull gear may form a bearing retention lip and the propulsion assembly may include a bearing retainer configured to clamp the outer race of the ball bearing against the bearing retention lip such that the outer race of the ball bearing is interposed between the bearing retainer and the bearing retention lip. In certain embodiments, the bearing retainer may be aft of the ball bearing. In some embodiments, the bearing retention lip may be a circumferential bearing retention lip. In certain embodiments, the inner race may abut the outer surface of the flexured standpipe. In some embodiments, the inner race of the ball bearing may be integral with the flexured standpipe. In certain embodiments, radial loads may be transmitted from the bull gear to the flexured standpipe via the ball bearing. In some embodiments, the ball bearing may be nonflexibly coupled to the bull gear.

In a second aspect, the present disclosure is directed to a rotorcraft including a fuselage and a propulsion assembly coupled to the fuselage. The propulsion assembly includes a rotor assembly, a mast coupled to the rotor assembly and a bull gear coupled to the mast. The bull gear is subject to radial and axial loads. The propulsion assembly also includes a flexured standpipe extending through the bull gear and a ball bearing including inner and outer races interposed between the bull gear and the flexured standpipe. The ball bearing is configured to absorb axial loads from the bull gear. The bull gear is rotatably coupled to the flexured standpipe via the ball bearing. The flexured standpipe flexes in response to radial loads from the bull gear.

In some embodiments, the rotorcraft may be a tiltrotor aircraft and the rotor assembly may be a proprotor assembly. In certain embodiments, the rotorcraft may be a helicopter and the propulsion assembly may be a main rotor assembly. In some embodiments, the propulsion assembly may include a pinion gear configured to mesh with the bull gear via helical gear teeth. In certain embodiments, the propulsion assembly may include a planetary gear system interposed between the mast and the bull gear.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2D are schematic illustrations of a tiltrotor aircraft having propulsion assemblies utilizing flexured standpipes in accordance with embodiments of the present disclosure;

DETAILED DESCRIPTION

Figure 1A:
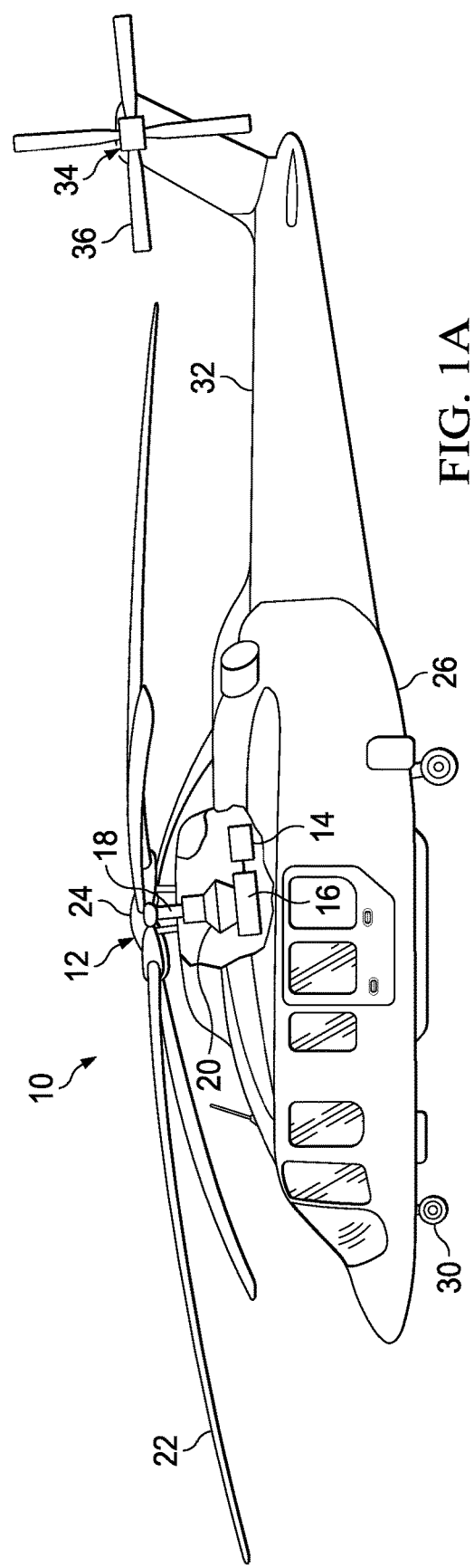
FIGS. 1A-1D are schematic illustrations of a helicopter having a main rotor assembly utilizing a flexured standpipe in accordance with embodiments of the present disclosure.
Figure 1B:
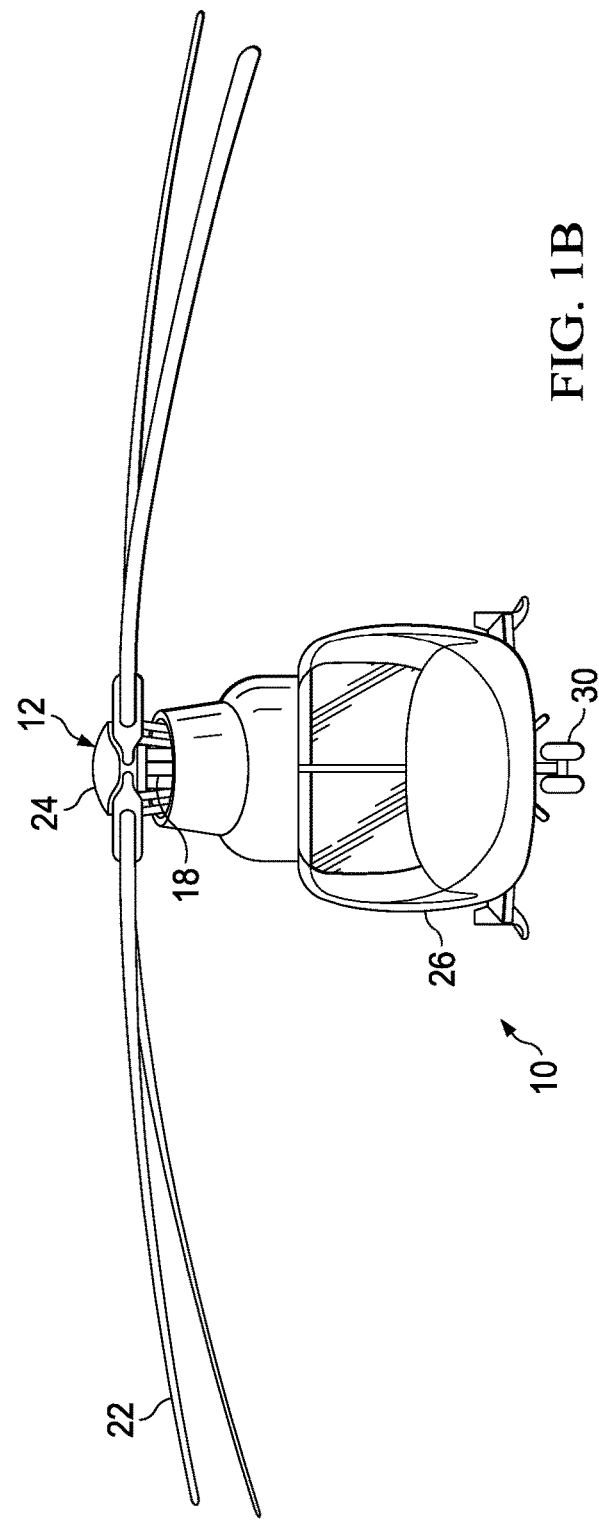
Figure 1C:
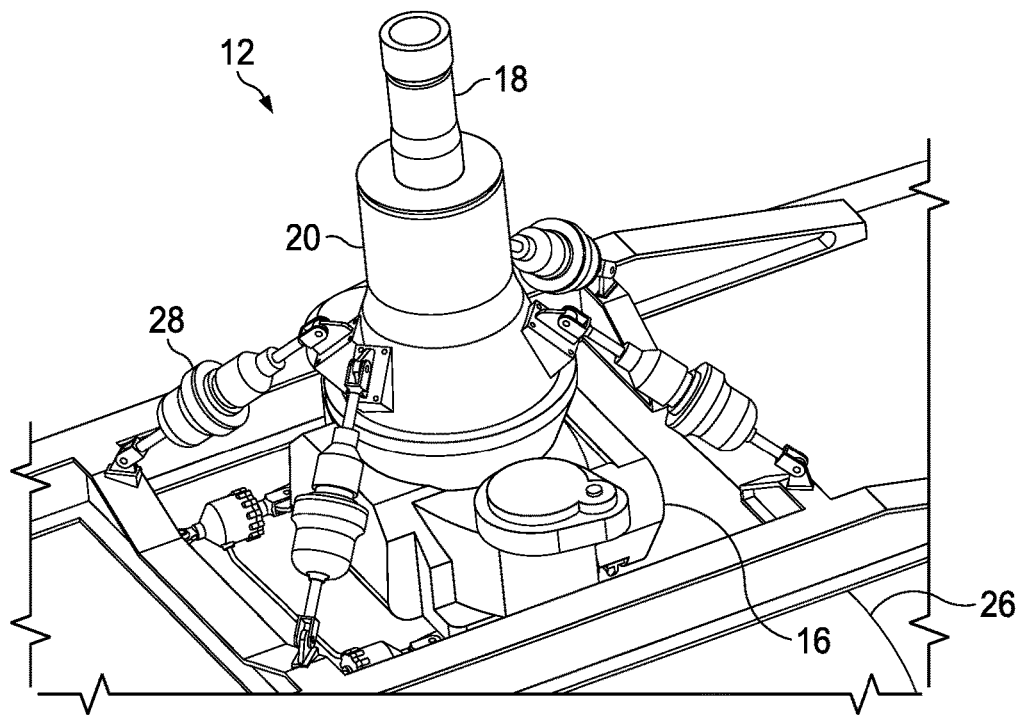
Figure 1D:
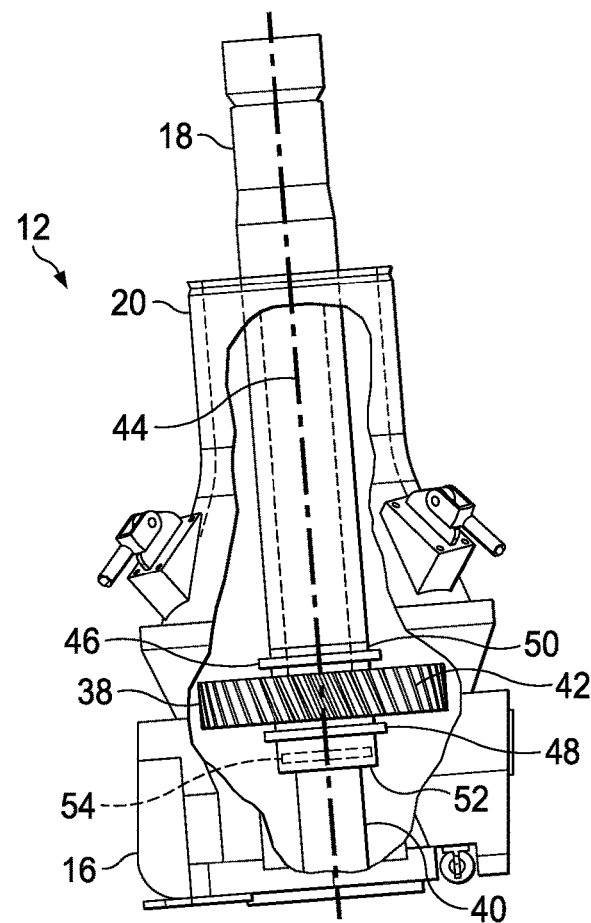

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1D in the drawings, a helicopter is schematically illustrated and generally designated 10. The primary propulsion assembly of helicopter 10 is a main rotor assembly 12 powered by an engine 14 via a main rotor gearbox 16. Mast 18 extends through a top case 20, which houses a mast bearing assembly to facilitate the stable rotation of mast 18. Main rotor assembly 12 includes a plurality of rotor blade assemblies 22 extending radially outward from a main rotor hub 24. Main rotor assembly 12 is coupled to a fuselage 26. A vibration isolation system 28 may be utilized to isolate the vibration of main rotor assembly 12 from fuselage 26 and the components and passengers therein. Main rotor hub 24 is rotatable relative to fuselage 26. The pitch of rotor blade assemblies 22 can be collectively and/or cyclically manipulated to selectively control direction, thrust and lift of helicopter 10. A landing gear system 30 provides ground support for helicopter 10. A tailboom 32 extends from fuselage 26 in the aft direction. An anti-torque system 34 includes a tail rotor 36 that is rotatably coupled to the aft portion of tailboom 32. Anti-torque system 34 controls the yaw of helicopter 10.

Engine 14, main rotor gearbox 16, mast 18 and main rotor hub 24 are part of a powertrain that provides propulsion for helicopter 10. Included within main rotor gearbox 16 is a bull gear 38 coupled to mast 18. Bull gear 38 may mate with a pinion gear (not shown) that provides rotational energy to bull gear 38, which in turn provides rotational energy to mast 18 and main rotor hub 24. It will be appreciated by one of ordinary skill in the art that bull gear 38 may alternatively be a pinion gear or any other type of gear that transmits rotational energy to mast 18, either directly or indirectly. A flexured standpipe 40 extends through bull gear 38 and does not rotate with bull gear 38. Wires and/or other devices may pass through flexured standpipe 40 to provide communication between main rotor hub 24 and other helicopter systems such as the flight control computer.

In operation, bull gear 38 may be subject to both axial and radial loads. The axial loads experienced by bull gear 38 may be caused by the use of helical gear teeth 42 on both bull gear 38 and a complementary pinion gear. In other embodiments, bull gear 38 may be a spiral bevel gear. When bull gear 38 experiences axial loads, bull gear 38 moves axially relative to flexured standpipe 40 along axis 44. Forward and aft roller bearings 46, 48 are coupled to forward and aft collars 50, 52 of bull gear 38, respectively, to absorb the radial loads from bull gear 38. A ball bearing 54 interposed between flexured standpipe 40 and aft collar 52 of bull gear 38 accommodates the axial movement of bull gear 38 along axis 44 resulting from the axial loads experienced by bull gear 38. Bull gear 38 is rotatably coupled to flexured standpipe 40 via ball bearing 54. While ball bearing 54 is intended to accommodate the axial loads of bull gear 38, radial loads from bull gear 38 are also transmitted from bull gear 38 to flexured standpipe 40 via ball bearing 54. Previous attempts to address the radial loads transmitted through a ball bearing in a roller-roller-ball bearing configuration have resulted in various drawbacks including fretting of the ball bearing and unduly complex or costly structures. The illustrative embodiments address these drawbacks by including flexured standpipe 40, which flexes in response to radial loads transmitted through ball bearing 54 from bull gear 38.

Referring to FIGS. 2A-2D in the drawings, a tiltrotor aircraft is schematically illustrated and generally designated 100. Tiltrotor aircraft 100 includes a fuselage 102, a wing mount assembly 104 and a tail assembly 106. Tail assembly 106 may have control surfaces operable for horizontal and/or vertical stabilization during flight. A landing gear system 108 provides ground support for tiltrotor aircraft 100. A wing 110 is supported by fuselage 102 and wing mount assembly 104.

Figure 2A:
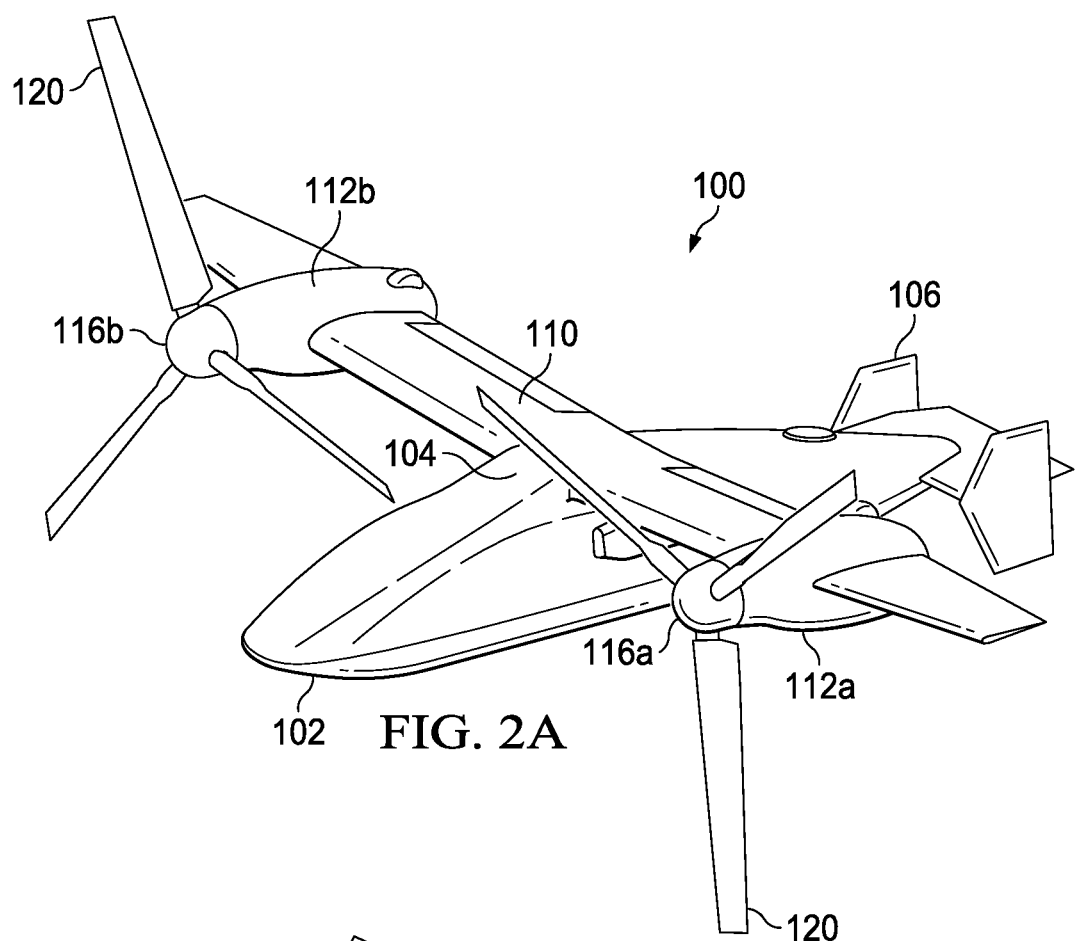
Figure 2B:
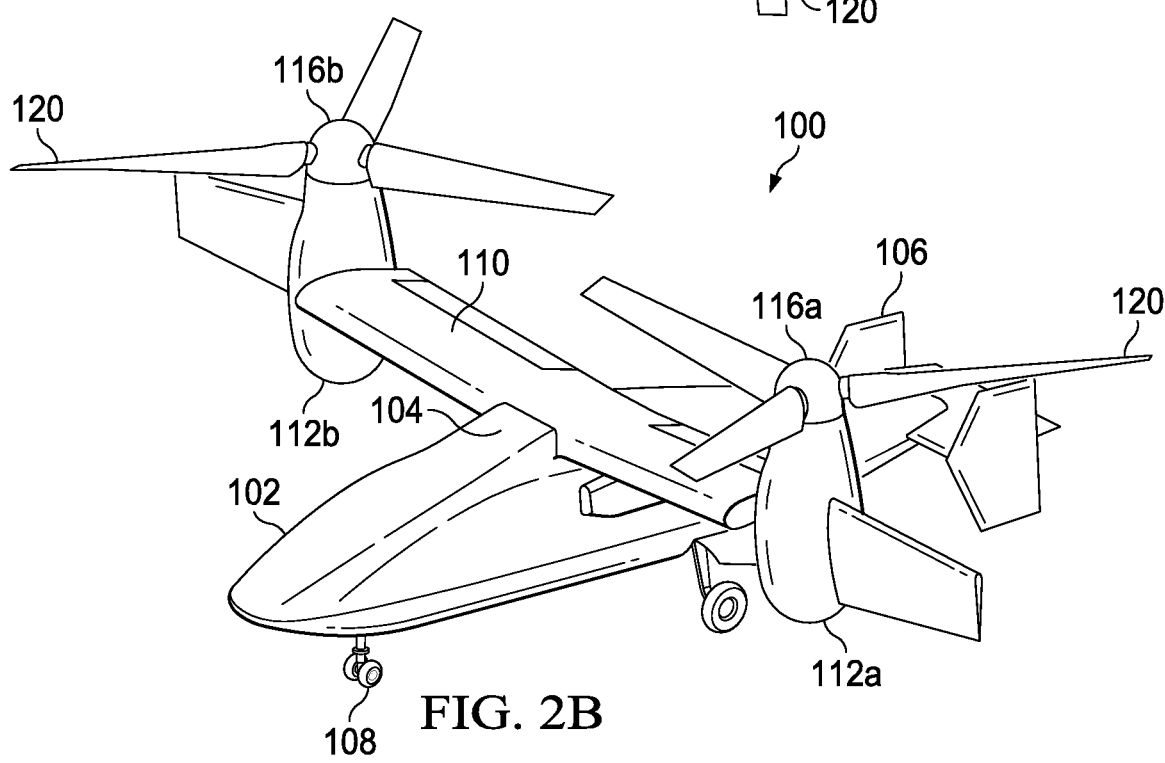

Coupled to the outboard ends of wing 110 are pylon assemblies 112a, 112b. Pylon assembly 112a is rotatable relative to wing 110 between a generally horizontal orientation, as best seen in FIGS. 2A and 2C, and a generally vertical orientation, as best seen in FIG. 2B. Pylon assembly 112a includes a rotatable portion of a powertrain 114 and a proprotor assembly 116a including a proprotor hub assembly that is rotatable responsive to torque and rotational energy provided by an engine or motor 118 of powertrain 114. Likewise, pylon assembly 112b is rotatable relative to wing 110 between a generally horizontal orientation, as best seen in FIGS. 2A and 2C, and a generally vertical orientation, as best seen in FIG. 2B. Pylon assembly 112b includes a rotatable portion of powertrain 114 and a proprotor assembly 116b including a proprotor hub assembly that is rotatable responsive to torque and rotational energy provided by engine 118 of powertrain 114. In the illustrated embodiment, proprotor assemblies 116a, 116b each include three proprotor blade assemblies 120. It should be understood by those having ordinary skill in the art, however, that proprotor assemblies 116a, 116b could alternatively have a different number of proprotor blade assemblies, either less than or greater than three. In addition, it should be understood that the position of pylon assemblies 112a, 112b, the angular velocity or revolutions per minute (RPM) of proprotor assemblies 116a, 116b, the pitch of proprotor blade assemblies 120 and the like may be controlled by the pilot of tiltrotor aircraft 100 and/or a flight control system to selectively control the direction, thrust and lift of tiltrotor aircraft 100 during flight.

FIGS. 2A and 2C illustrate tiltrotor aircraft 100 in a forward flight mode or airplane flight mode, in which proprotor assemblies 116a, 116b are positioned to rotate in a substantially vertical plane and provide a forward thrust while a lifting force is supplied by wing 110 such that tiltrotor aircraft 100 flies much like a conventional propeller driven aircraft. FIG. 2B illustrates tiltrotor aircraft 100 in a vertical takeoff and landing (VTOL) flight mode or helicopter flight mode, in which proprotor assemblies 116a, 116b are positioned to rotate in a substantially horizontal plane and provide a vertical thrust such that tiltrotor aircraft 100 flies much like a conventional helicopter. During operation, tiltrotor aircraft 100 may convert from helicopter flight mode to airplane flight mode following vertical takeoff and/or hover. Likewise, tiltrotor aircraft 100 may convert back to helicopter flight mode from airplane flight mode for hover and/or vertical landing. In addition, tiltrotor aircraft 100 can perform certain flight maneuvers with proprotor assemblies 116a, 116b positioned between airplane flight mode and helicopter flight mode, which can be referred to as conversion flight mode.

Tiltrotor aircraft 100 uses powertrain 114 including engine 118 and a transmission subsystem including gearboxes 122, 124 and pylon transmissions 126, 128 for providing torque and rotational energy to each proprotor assembly 116a, 116b via interconnected driveshaft 130 located in wing 110. Gearboxes 122, 124 are located in fuselage 102 and pylon transmissions 126, 128 are located in pylon assemblies 112a, 112b. Gearboxes 122, 124 and pylon transmissions 126, 128 may employ any type or combination of gears or gearboxes such as a spiral bevel gearbox, helical gearbox, coaxial helical inline gearbox, bevel helical gearbox, skew bevel helical gearbox, worm reduction gearbox, planetary gearbox, spur gearbox or any other assembly utilizing gears. For example, gearboxes 122, 124 and pylon transmissions 126, 128 may include helical gears and/or spiral bevel gears. In other embodiments, each pylon assembly 112a, 112b houses a drive system, such as an engine, motor and/or transmission subsystem, for supplying torque and rotational energy to a respective proprotor assembly 116a, 116b. In such embodiments, the drive systems of each pylon assembly 112a, 112b may be coupled together via one or more driveshafts located in wing 110 such that either drive system can serve as a backup to the other drive system in the event of a failure. In tiltrotor aircraft having both pylon and fuselage mounted drive systems, the fuselage mounted drive system may serve as a backup drive system in the event of failure of either or both of the pylon mounted drive systems.

Pylon transmission 128 is substantially similar to pylon transmission 126 therefore, for sake of efficiency, certain features will be disclosed only with regard to pylon transmission 128. One having ordinary skill in the art, however, will fully appreciate an understanding of pylon transmission 126 based upon the disclosure herein of pylon transmission 128. As best seen in FIG. 2D, included within pylon transmission 128 is bull gear 132, which is coupled to mast 134. Bull gear 132 may receive rotational energy from pinion gear 136 and provide rotational energy to mast 134 and proprotor assembly 116b. A flexured standpipe 138 extends through bull gear 132 and does not rotate with bull gear 132. Wires and/or other devices may pass through flexured standpipe 138 to provide communication between proprotor assembly 116b and other aircraft systems such as the flight control computer.

In operation, bull gear 132 may be subject to both axial and radial loads. The axial loads experienced by bull gear 132 may be caused by the use of helical gear teeth 140 on both bull gear 132 and pinion gear 136. When bull gear 132 experiences axial loads, bull gear 132 moves axially relative to flexured standpipe 138 along axis 142. Forward and aft roller bearings 144, 146 are coupled to forward and aft collars 148, 150 of bull gear 132, respectively, to absorb the radial loads from bull gear 132. Ball bearing 152 interposed between flexured standpipe 138 and aft collar 150 of bull gear 132 accommodates the axial movement of bull gear 132 along axis 142 resulting from the axial loads experienced by bull gear 132. Bull gear 132 is rotatably coupled to flexured standpipe 138 via ball bearing 152. While ball bearing 152 is intended to accommodate the axial loads of bull gear 132, radial loads from bull gear 132 are also transmitted from bull gear 132 to flexured standpipe 138 via ball bearing 152. Flexured standpipe 138 flexes in response to radial loads transmitted through ball bearing 152 from bull gear 132.

It should be appreciated that helicopter 10 and tiltrotor aircraft 100 are merely illustrative of a variety of aircraft that can implement the embodiments disclosed herein. Indeed, propulsion assemblies utilizing flexured standpipes 40, 138 may be implemented on any aircraft. Other aircraft implementations can include hybrid aircraft, tiltwing aircraft, quad tiltrotor aircraft, unmanned aircraft, gyrocopters, propeller-driven airplanes, compound helicopters, drones, jets and the like. As such, those skilled in the art will recognize that propulsion assemblies utilizing flexured standpipes 40, 138 can be integrated into a variety of aircraft configurations. It should be appreciated that even though aircraft are particularly well-suited to implement the embodiments of the present disclosure, non-aircraft vehicles and devices can also implement the embodiments.

Figure 3:
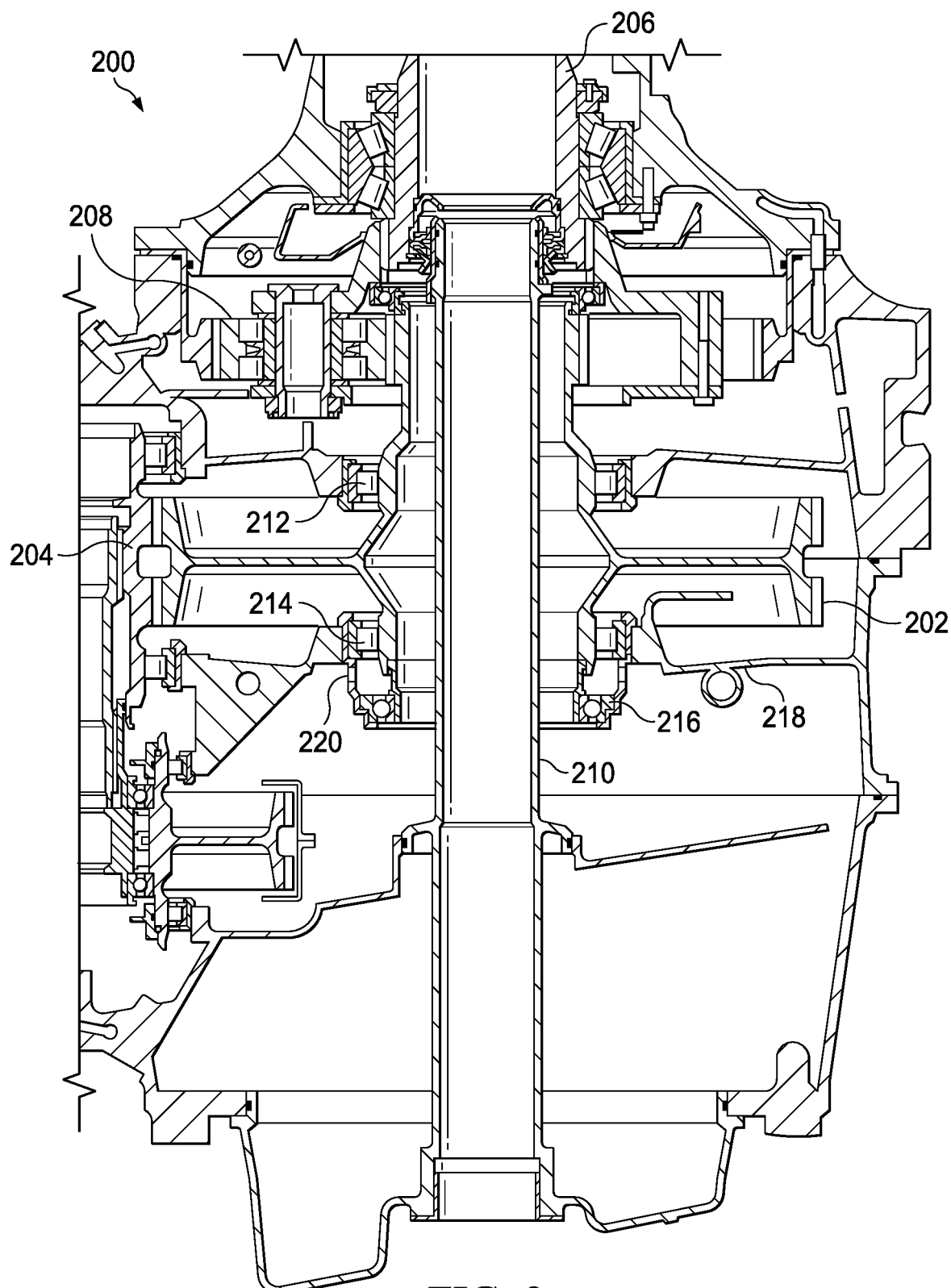
FIG. 3 is a cross-sectional view of a propulsion assembly utilizing case extensions to support a ball bearing.

Referring to FIG. 3 in the drawings, a propulsion assembly of a previous aircraft that employs various bearings to absorb axial and radial loads within a transmission is schematically illustrated and generally designated 200. Propulsion assembly 200 includes a bull gear 202, which receives rotational energy from pinion gear 204. Bull gear 202 is connected to mast 206 via planetary gear system 208. Standpipe 210 extends through bull gear 202 and does not rotate with bull gear 202. In addition, standpipe 210 does not contact or touch bull gear 202 directly or via a ball bearing and thus, bull gear 202 is not rotatably coupled to standpipe 210. Propulsion assembly 200 employs a roller-roller-ball bearing configuration to absorb the axial and radial loads from bull gear 202. In particular, propulsion assembly 200 employs roller bearings 212, 214 to absorb radial loads from bull gear 202. Ball bearing 216 accommodates the axial loads of bull gear 202. Although ball bearing 216 is intended to accommodate the axial loads of bull gear 202, ball bearing 216 must be free to move radially so that it does not take excessive radial loads from bull gear 202. Ball bearing 216 is supported by case extensions 218 and outer support wall 220, either or both of which may be flexible to accommodate radial loads from bull gear 202. Ball bearing 216 is interposed and clamped-up between bull gear 202 and outer support wall 220. Radial loads from bull gear 202 cause case extensions 218 and outer support wall 220 to flex to alleviate the load on ball bearing 216. Ball bearing 216 does not contact standpipe 210 either directly or indirectly. A major drawback of using flexible case extensions 218 and outer support wall 220 to support ball bearing 216 is that case extensions 218 and outer support wall 220 are complex and difficult to fit within propulsion assembly 200, making these parts expensive to manufacture.

Another current technique for configuring ball bearing 216 to take radial loads from bull gear 202 is to provide a loose fit, air gap or clearance within ball bearing 216 to allow the balls within ball bearing 216 to float radially. Because this approach requires leaving ball bearing 216 unclamped, however, ball bearing 216 experiences fretting and part deterioration. Neither previous approach to supporting ball bearing 216 utilizes standpipe 210 to allow for the radial movement of ball bearing 216. Because neither previous approach utilizes standpipe 210, there has heretofore existed no reason to modify the material composition, flexibility or other properties of standpipe 210 to accommodate the radial loads of bull gear 202.

Referring to FIGS. 4A-4E in the drawings, a propulsion assembly for an aircraft is schematically illustrated and generally designated 300. Propulsion assembly 300 includes main case 302 and top case 304 that includes portions of a drivetrain to transmit rotational energy to a rotor or proprotor assembly via multiple gears. More particularly, pinion gear 306 receives rotational energy from a driveshaft, such as interconnected driveshaft 130 in FIG. 2C, via spiral bevel gears 308. Pinion gear 306 transmits rotational energy to bull gear 310. In one example, pinion gear 306 meshes with bull gear 310 via helical gear teeth. Bull gear 310 includes forward and aft collars 312, 314. Collars 312, 314 are each hollow and substantially cylindrical shaped. Bull gear 310 provides rotational energy to mast 316 via planetary gear system 318. Planetary gear system 318 is interposed between bull gear 310 and mast 316. In the illustrated embodiment, forward collar 312 provides an input to planetary gear system 318 and planet carrier 320 outputs rotational energy from planetary gear system 318 to mast 316, to which planet carrier 320 is coupled. Mast 316 may then be coupled to a rotor or proprotor assembly that rotates in response to receiving rotational energy.

Flexured standpipe 322 extends through propulsion assembly 300 including through bull gear 310 and mast 316. Flexured standpipe 322 includes a ported end 324 at the aft end of propulsion assembly 300 through which wires and other devices for communication with the rotor or proprotor assembly may be passed. In the illustrated embodiment, flexured standpipe 322 is nonrotatable and does not rotate with bull gear 310 and mast 316. Bull gear 310 and mast 316 are rotatable about flexured standpipe 322. In some embodiments, flexured standpipe 322 may include a slip ring (not shown) that enables the portion of flexured standpipe 322 forward of the slip ring to rotate, thereby translating the wires in flexured standpipe 322 from fixed to rotating wires. The slip ring may be located within mast 316, within the rotor or proprotor assembly or at another location. Flexured standpipe 322 may be a separate component or integral with main case 302.

To accommodate the radial and axial loads experienced by bull gear 310, propulsion assembly 300 employs a roller-roller-ball bearing configuration that includes forward and aft roller bearings 326, 328 and ball bearing 330. Forward and aft roller bearings 326, 328 are coupled to forward and aft collars 312, 314 of bull gear 310, respectively, to absorb the radial loads from bull gear 310, thus constraining radial movement 332 of bull gear 310 relative to flexured standpipe 322. Ball bearing 330 accommodates axial loads from bull gear 310 by permitting axial movement 334 of bull gear 310 relative to flexured standpipe 322. Ball bearing 330 is interposed between, and in contact with, bull gear 310 and flexured standpipe 322. More particularly, ball bearing 330 is interposed between flexured standpipe 322 and aft collar 314 of bull gear 310. Ball bearing 330 extends around the circumference of flexured standpipe 322. Bull gear 310 is rotatably coupled to flexured standpipe 322 via ball bearing 330. In the illustrated embodiment, no flexure is interposed between ball bearing 330 and bull gear 310 and no case extension is interposed between ball bearing 330 and main case 302 to support ball bearing 330. Ball bearing 330 may thus be considered to be stiffly, or nonflexibly, coupled to bull gear 310 in some embodiments. Bull gear 310, mast 316, flexured standpipe 322 and ball bearing 330 are substantially coaxial.

Ball bearing 330 is clamped to flexured standpipe 322 and bull gear 310 to reduce fretting and other deterioration of ball bearing 330. Inner race 336 of ball bearing 330 is clamped to flexured standpipe 322. More particularly, flexured standpipe 322 forms a bearing retention lip 338 that extends around the circumference of flexured standpipe 322. A bearing retainer 340, disposed forward of ball bearing 330, clamps inner race 336 of ball bearing 330 against bearing retention lip 338 of flexured standpipe 322 such that inner race 336 of ball bearing 330 is interposed between bearing retainer 340 and bearing retention lip 338. Inner race 336 of ball bearing 330 abuts the outer surface of flexured standpipe 322. Bearing retainer 340 may be a threaded nut, a non-threaded nut or any other retainer to secure inner race 336. For example, bearing retainer 340 may be a threaded nut with inner threads that thread onto flexured standpipe 322. Outer race 342 of ball bearing 330 is clamped to bull gear 310. More particularly, aft collar 314 of bull gear 310 forms a circumferential bearing retention lip 344. Bearing retention lip 344 is formed on the inner surface of aft collar 314. Bearing retainer 346, disposed aft of ball bearing 330, clamps outer race 342 of ball bearing 330 against bearing retention lip 344 of bull gear 310 such that outer race 342 of ball bearing 330 is interposed between bearing retainer 346 and bearing retention lip 344. Outer race 342 abuts the inner surface of aft collar 314 of bull gear 310. Bearing retainer 346 may be a threaded nut, a non-threaded nut or any other retainer to secure outer race 342. For example, bearing retainer 346 may be a threaded nut with outer threads that thread onto the inner surface of aft collar 314 of bull gear 310. Aft collar 314 of bull gear 310 surrounds ball bearing 330 and bearing retainers 340, 346, which are configured to clamp ball bearing 330. Bull gear 310, flexured standpipe 322, ball bearing 330 and/or bearing retainers 340, 346 may be manufactured using any additive, subtractive or formative manufacturing technique including, but not limited to, extrusion, machining, 3D printing, laser cutting, stamping, welding or casting as well as others.

Figure 4A:
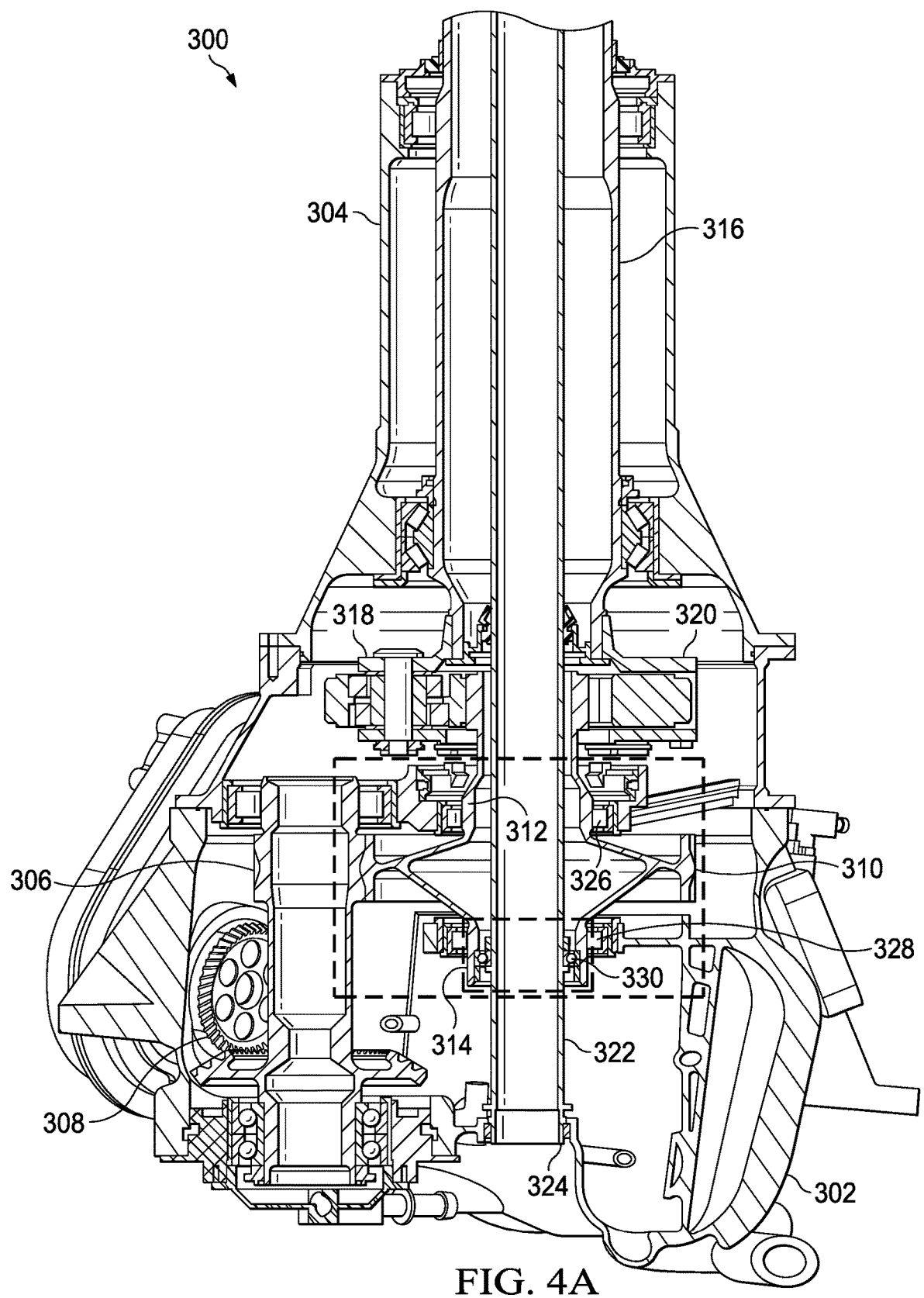
FIGS. 4A-4E are various views of a propulsion assembly utilizing a flexured standpipe in accordance with embodiments of the present disclosure.
Figure 4B:
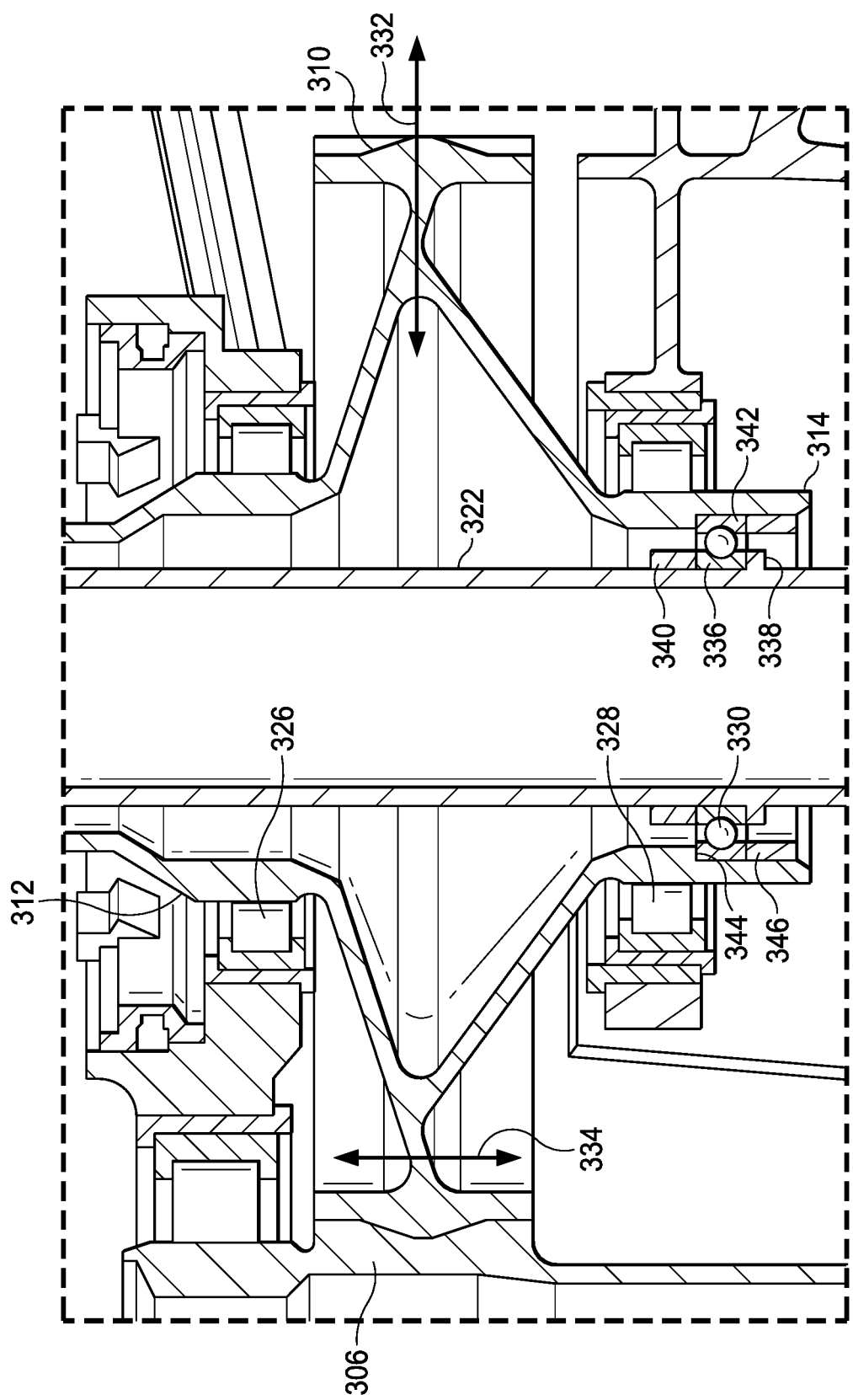
Figure 4C:
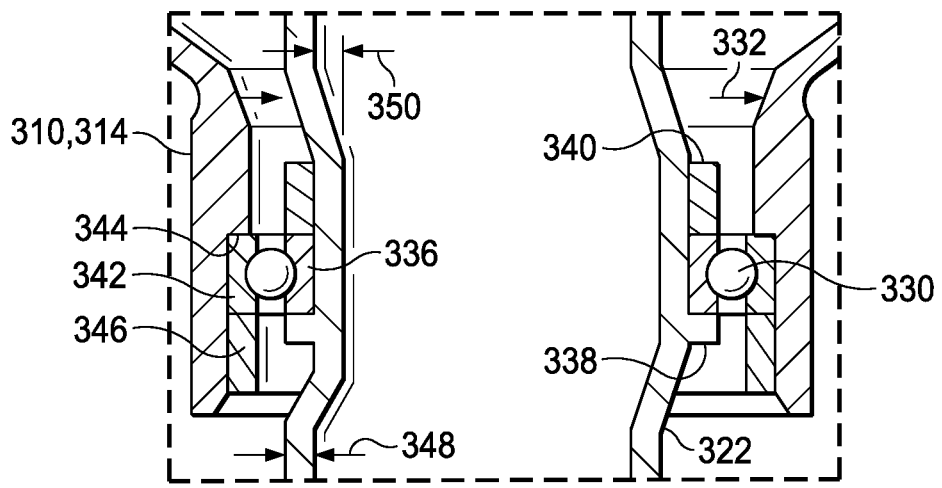
Figure 4D:
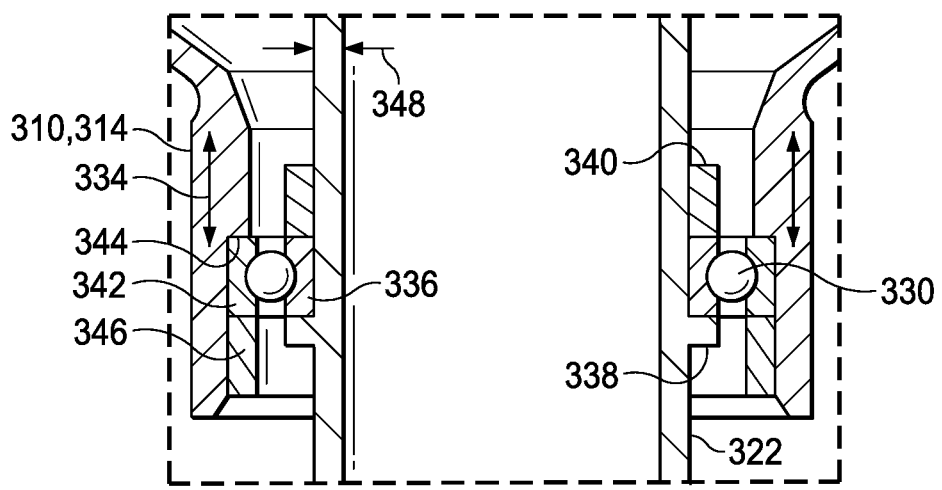
Figure 4E:
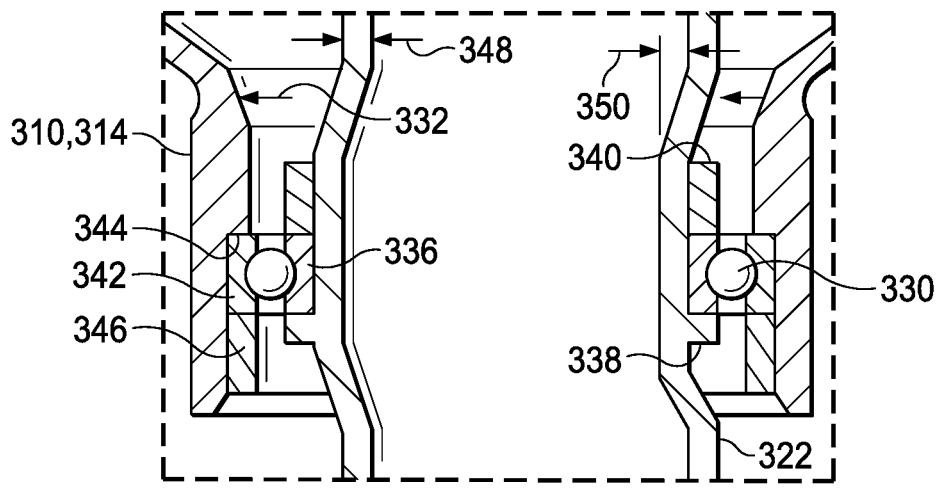

One purpose of ball bearing 330 is to keep bull gear 310 axially restrained, so inner and outer races 336, 342 may be axially constrained to each other. In some circumstances, because inner race 336 is clamped to flexured standpipe 322 and outer race 342 is clamped to bull gear 310, outer race 342 may move axially relative to inner race 336 in response to absorbing axial loads 334 from bull gear 310. Radial loads 332 are transmitted from bull gear 310 to flexured standpipe 322 via ball bearing 330. As best seen in FIGS. 4C-4E, flexured standpipe 322 flexes, or bends, in response to radial loads 332 from bull gear 310, which has been exaggerated for illustrative purposes. Flexured standpipe 322 has a thickness 348 that permits flexured standpipe 322 to flex in response to radial loads 332. Flexured standpipe 322 is formed from a material that permits such flexing. For example, flexured standpipe 322 may be formed from a metallic material such as aluminum or a composite material that includes thermoplastics, elastomers, carbon and/or other materials. In some embodiments, flex distance 350 of flexured standpipe 322, which is the distance that flexured standpipe 322 flexes in response to radial loads 332, is on the order of thousandths of an inch. In one non-limiting example, flex distance 350 is in a range between five and ten thousandths of an inch.

Standpipes from previous aircraft, such as standpipe 210 in FIG. 3, are not flexured, which if used in propulsion assembly 300, would subject ball bearing 330 to stress and damage due to the nonflexured standpipe's inability to take up radial load 332. The use of flexured standpipe 322 as described in the illustrative embodiments is also more weight and cost efficient than the previous implementation described in FIG. 3 because no case extensions or cages are required to support ball bearing 330 from main case 302. These weight and cost savings are realized by employing flexured standpipe 322 for the dual purposes of both passing wires through propulsion assembly 300 and absorbing radial loads 332 from bull gear 310. Propulsion assembly 300 also does not require flexures that are independent of flexured standpipe 322, thereby simplifying the overall design. Nonetheless, additional and/or independent flexures may be used in conjunction with the illustrative embodiments if desired. Furthermore, no fretting of ball bearing 330 occurs because ball bearing 330 is fully clamped to bull gear 310 and flexured standpipe 322.

Figure 5:
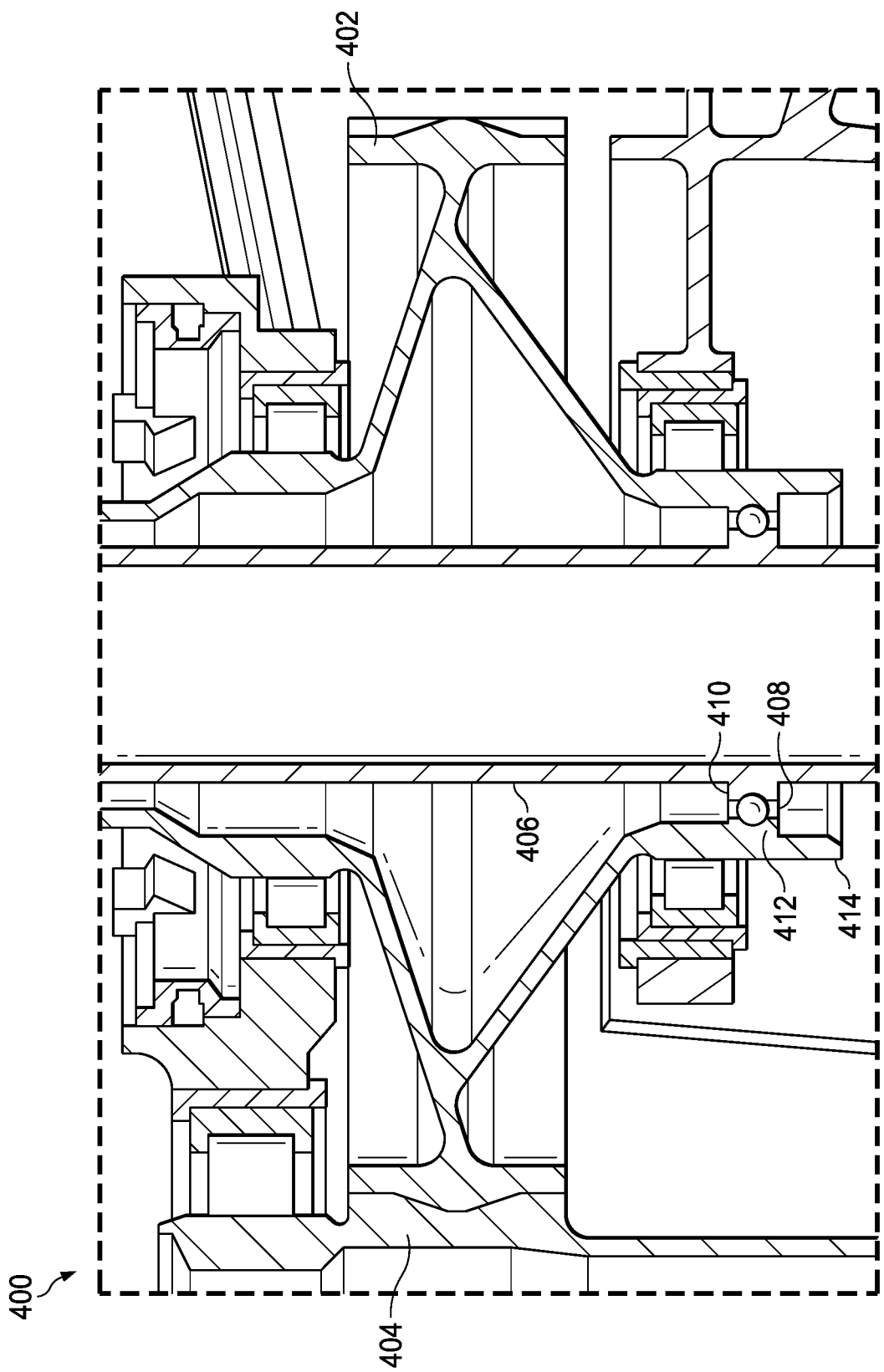
FIG. 5 is a cross-sectional view of a portion of a propulsion assembly utilizing a flexured standpipe and a ball bearing having integral races in accordance with embodiments of the present disclosure.

Referring to FIG. 5 in the drawings, a portion of a propulsion system is schematically illustrated and generally designated 400. Bull gear 402 receives rotational energy from pinion gear 404 and rotates about flexured standpipe 406. Bull gear 402 is rotatably coupled to flexured standpipe 406 via ball bearing 408. Flexured standpipe 406 extends through the central chamber formed by bull gear 402. Bull gear 402 may be coupled to a mast that provides rotational energy to a rotor or proprotor hub assembly.

Inner race 410 of ball bearing 408 is integral with flexured standpipe 406. Outer race 412 of ball bearing 408 is integral with aft collar 414 of bull gear 402. By integrating inner and outer races 410, 412 with flexured standpipe 406 and bull gear 402, respectively, less components may be required to rotatably couple bull gear 402 to flexured standpipe 406. For example, bearing retainers 340, 346 and bearing retention lips 338, 344 of FIGS. 4A-4E may not be necessary in the illustrated embodiment, further reducing the cost and weight of propulsion assembly 400. In other embodiments, only one of races 410, 412 may be integral with surrounding components. For example, inner race 410 may be integral with flexured standpipe 406 while outer race 412 is structurally separate from aft collar 414 of bull gear 402. Alternatively, outer race 412 may be integral with aft collar 414 of bull gear 402 while inner race 410 is structurally separate from flexured standpipe 406.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A propulsion assembly comprising:
a rotor assembly;
a mast coupled to the rotor assembly;
a bull gear coupled to the mast, the bull gear subject to radial and axial loads;
a flexured standpipe extending through the bull gear; and
a ball bearing including inner and outer races interposed between the bull gear and the flexured standpipe, the ball bearing configured to absorb axial loads from the bull gear;
wherein, the bull gear is rotatably coupled to the flexured standpipe via the ball bearing; and
wherein, the flexured standpipe flexes in response to radial loads from the bull gear.

2. The propulsion assembly as recited in claim 1 wherein the bull gear further comprises a forward collar and an aft collar; and
wherein, the ball bearing is interposed between the flexured standpipe and the aft collar of the bull gear.

3. The propulsion assembly as recited in claim 2 wherein the inner surface of the aft collar forms a circumferential bearing retention lip.

4. The propulsion assembly as recited in claim 2 further comprising forward and aft roller bearings coupled to the forward and aft collars of the bull gear, the roller bearings configured to absorb the radial loads from the bull gear.

5. The propulsion assembly as recited in claim 4 wherein the ball bearing is aft of the aft roller bearing.

6. The propulsion assembly as recited in claim 2 wherein the outer race of the ball bearing is integral with the aft collar of the bull gear.

7. The propulsion assembly as recited in claim 1 wherein the mast, the bull gear, the flexured standpipe and the ball bearing are substantially coaxial.

8. The propulsion assembly as recited in claim 1 wherein the flexured standpipe extends through the mast.

9. The propulsion assembly as recited in claim 1 wherein the flexured standpipe does not rotate with the bull gear and the mast.

10. The propulsion assembly as recited in claim 1 wherein the ball bearing is clamped to the flexured standpipe and the bull gear.

11. The propulsion assembly as recited in claim 1 wherein the inner race of the ball bearing is clamped to the flexured standpipe and the outer race of the ball bearing is clamped to the bull gear.

12. The propulsion assembly as recited in claim 1 wherein the inner race abuts the outer surface of the flexured standpipe.

13. The propulsion assembly as recited in claim 1 wherein the inner race of the ball bearing is integral with the flexured standpipe.

14. The propulsion assembly as recited in claim 1 wherein the radial loads are transmitted from the bull gear to the flexured standpipe via the ball bearing.

15. The propulsion assembly as recited in claim 1 wherein the ball bearing is nonflexibly coupled to the bull gear.

16. A rotorcraft comprising:
a fuselage; and
a propulsion assembly coupled to the fuselage, the propulsion assembly comprising:
a rotor assembly;
a mast coupled to the rotor assembly;
a bull gear coupled to the mast, the bull gear subject to radial and axial loads;
a flexured standpipe extending through the bull gear; and
a ball bearing including inner and outer races interposed between the bull gear and the flexured standpipe, the ball bearing configured to absorb axial loads from the bull gear;
wherein the bull gear is rotatably coupled to the flexured standpipe via the ball bearing; and
wherein the flexured standpipe flexes in response to radial loads from the bull gear.

17. The rotorcraft as recited in claim 16 wherein the rotorcraft further comprises a tiltrotor aircraft and the rotor assembly further comprises a proprotor assembly.

18. The rotorcraft as recited in claim 16 wherein the rotorcraft further comprises a helicopter and the propulsion assembly further comprises a main rotor assembly.

19. The rotorcraft as recited in claim 16 wherein the propulsion assembly further comprises a pinion gear configured to mesh with the bull gear via helical gear teeth.

20. The rotorcraft as recited in claim 16 wherein the propulsion assembly further comprises a planetary gear system interposed between the mast and the bull gear.

* * * * *